United States Patent [19]

Suwa et al.

[11] Patent Number: 5,027,229

[45] Date of Patent: Jun. 25, 1991

[54] MAGNETIC RECORDING APPARATUS AND MAGNETIC RECORDING/REPRODUCING APPARATUS

[75] Inventors: Tetsuya Suwa, Yokohama; Seiji Higurashi, Fuchu, both of Japan

[73] Assignee: Victor Company of Japan, Ltd., Yokohama, Japan

[21] Appl. No.: 327,266

[22] Filed: Mar. 22, 1989

[30] Foreign Application Priority Data

Mar. 23, 1988 [JP] Japan .................................. 63-68694

[51] Int. Cl.[5] .......................................... H04N 5/782
[52] U.S. Cl. .................................. 360/19.1; 360/131; 358/328; 358/341
[58] Field of Search ................. 360/19.1, 84, 134, 131, 360/33.1, 135; 358/330, 341, 327, 328, 310

[56] References Cited

U.S. PATENT DOCUMENTS

| | | | |
|---|---|---|---|
| 3,925,816 | 12/1975 | Kihara | 358/328 |
| 4,313,140 | 1/1982 | Keidl | 360/131 |
| 4,901,159 | 2/1990 | Hitotsumachi | 358/341 |
| 4,908,809 | 3/1990 | Tadokoro et al. | 360/131 |

Primary Examiner—Roy N. Envall, Jr.
Assistant Examiner—Hung Dang
Attorney, Agent, or Firm—Fleit, Jacobson, Cohn, Price, Holman & Stern

[57] ABSTRACT

There is provided a magnetic recording/reproduction apparatus adapted to record/reproduce a video signal, a digital signal, and a FM audio signal at the surface layer portion of the magnetic layer of a magnetic tape, the intermediate layer portion thereof, and the lower layer portion thereof, respectively. This apparatus is provided with on the recording side thereof, a first modulator for generating a frequency modulated audio signal, a first rotary head for recording the audio signal from the first modulator at a lower layer portion of the magnetic tape, a second modulator for generating a digital signal having undergone, a poly-phase differential phase shift modulation, an amplitude change elimination circuit such as a limiter for eliminating changes in the amplitude of the digital signal from the second modulator, a second rotary head for recording the digital signal from the second modulator at an intermediate layer portion thereof, a video signal processing circuit for processing a video signal, and a third rotary head for recording the video signal from the video signal processing circuit at a upper layer portion thereof. This apparatus is also provided on the reproduction side, with a circuit configuration corresponding to the above-mentioned circuit configuration on the recording side in order to satisfactorily reproduce the above-mentioned three kinds of recorded signals.

3 Claims, 5 Drawing Sheets

MAGNETIC RECORDING APPARATUS AND MAGNETIC RECORDING/REPRODUCING APPARATUS

BACKGROUND OF THE INVENTION

This invention relates to a magnetic recording apparatus and a magnetic recording/reproducing apparatus, and more particularly to a magnetic recording apparatus and a magnetic recording/reproducing apparatus adapted to record or reproduce a digital signal modulated in accordance with the modulation system based on the polyphase PSK (Phase Shift Keying) such as the Offset Quadrature Differential Phase Shift Keying (OQDPSK), or the Quadrature Differential Phase Shift Keying (QDPSK), or a frequency-modulated FM audio signal at the lower (deep) layer portion of the magnetic layer of a magnetic tape, and to record or reproduce a video signal at the upper (surface )layer portion thereof.

FIG. 1 is a block diagram showing the system configuration of a magnetic recording/reproducing apparatus comprising in combination, a conventional magnetic recording unit and the reproducing system thereof. Referring to this figure, a color video signal incoming to the input terminal 41 is converted to, e.g., a frequency-division multiplex signal consisting of a low frequency band carrier chrominance signal and a frequency-modulated luminance signal. The signal thus obtained, is passed through a recording amplifier 43 and a switching circuit 44, and is then recorded onto a magnetic tape 46 by means of rotary heads 45a and 45b.

On one hand, respective audio signals of the left channel (Lch) and the right channel (Rch) incoming to the input terminals $47_L$ and $47_R$, are converted to a pulse code modulated (PCM) signal and are subjected to time division-multiplexing by an A/D (analog-to-digital) converter 48 and a digital signal processing circuit 49. Then, the signal thus processed, is modulated by an OQDPSK modulator 50 in accordance with the offset quadrature differential PSK modulation system. This modulated signal is sequentially passed through a recording amplifier 51 and a switching circuit 52 and is then recorded onto the magnetic tape 46 by means of rotary heads 53a and 53b.

In this instance, on an audio track where the OQDPSK modulated digital audio signal is recorded at the lower layer portion of the magnetic layer of the magnetic tape 46 by means of rotary heads 53a and 53b, the above-mentioned frequency division-multiplex video signal is recorded at the upper layer portion of the magnetic layer while forming a video track by means of rotary heads 45a and 45b.

At the time of reproducing or playback, the frequency division-multiplex video signal reproduced from the video track by means of the rotary heads 45a and 45b is sequentially passed through the switching circuit 44 and a reproducing amplifier 54 and is then delivered to a video signal processing circuit 55, by which it is converted back to the original reproduced color video signal and is then output to the output terminal 56.

On the other hand, the digital audio signal reproduced from the audio track by means of the rotary heads 53a and 53b is sequentially passed through the switching circuit 52, a reproducing amplifier 57, a waveform equalizer 58, and an OQDPSK demodulator 59, and is then delivered to a digital signal processing circuit 60, at which it is converted to a reproduced PCM signal. Then, it is converted back to the original analog audio signal by a D/A (digital-to-analog) converter 61. Thus, a left-channel reproduced audio signal and a right-channel reproduced audio signal are separately and concurrently delivered to the output terminals $62_L$ and $62_R$.

As just described above, the conventional apparatus shown in FIG. 1 is a rotary head type VTR of the lower layer recording system. This apparatus directly records an OQDPSK modulated digital audio signal at the deep layer portion of the magnetic layer of the magnetic tape 46. This recording/reproducing apparatus was already disclosed in the papers e.g., Arai et al., "A STUDY ON THE DIGITALIZATION OF AUDIO SIGNALS FOR VIDEO TAPERECORDER", International Conference on Acoustics. Speech and Signal Processing, p. 29-33, 1986. In addition, the lower layer recording technology is disclosed in U.S. Pat. No. 3,542,946.

Since the conventional apparatus shown in FIG. 1 can record/reproduce digital audio signals, advantageously resulting in high quality speech. However, recording/reproducing audio signals in FM format, which is now popular for VTRs, can not be performed by the conventional apparatus of FIG. 1, and the apparatus fails to cope with video software already distributed in the market in which only FM audio signals are prerecorded. For this reason, in the prerecorded tape industrial world, even in the case where one video software has the same content as that of another one, the video software in which digital audio signals are recorded must be also prepared independent of the video software in which FM audio signals are recorded, resulting in the requirement of much time and poor economy.

SUMMARY OF THE INVENTION

An object of this invention is to provide a magnetic recording /reproducing apparatus capable of recording/reproducing FM audio signals and digital audio signals along with video signals.

According to this invention, there is provided a magnetic recording apparatus comprising: first modulator means for generating a frequency-modulated audio signal; a first rotary head for recording audio signal from first modulation means at a lower layer portion of a magnetic layer of a magnetic tape; second modulator means for generating a digital signal having undergone poly-phase differential phase shift keying modulation; amplitude change elimination means for eliminating changes in the amplitude of digital signal from second modulator means; a second rotary head having an azimuth angle different from that of first rotary head for recording digital signal from amplitude change elimination means at an intermediate layer portion of the magnetic layer of magnetic tape; video signal recording processing means for processing a video signal; and a third rotary head having an azimuth angle different from those of first rotary head and second rotary head, for recording video signal from image signal recording processing means at an upper layer portion of the magnetic layer of magnetic tape, thus to record frequency-modulated audio signal and digital signal along with video signal at the magnetic layer portions different from each other.

Furthermore, a magnetic reproducing apparatus according to this invention is constructed to add, to the above-mentioned magnetic recording apparatus, first reproduction means for reproducing a recorded signal of a magnetic tape recorded by magnetic recording apparatus as set forth in claim 1 to reproduce a frequency-modulated audio signal, first demodulator means for frequency-demodulating reproduced frequency-modulated audio signal, second reproduction means for reproducing said digital signal recorded on magnetic tape, second demodulator means for applying the poly-phase differential phase shift keying demodulation or the offset poly-phase differential PSK phase shift keying demodulation to said reproduced digital signal, third reproduction means for reproducing video signal recorded on said magnetic tape, and video signal reproduction processing means for processing reproduced video signal, thereby to record, on magnetic tape, frequency-modulated audio signal and digital signal along with video signal, and to reproduce them therefrom.

The video signal, the digital signal and the FM audio signal have a frequency magnitude relationship determined in the order recited. In the case of recording these signals onto the magnetic tape, the FM audio signal having the lowest frequency is recorded at the lower layer portion of the magnetic layer, the video signal having the highest frequency is recorded at the upper layer portion of the magnetic layer, and the digital audio signal is recorded at the intermediate layer portion.

Furthermore, by providing the amplitude change elimination means to eliminate AM components included in the digital signal to thereby keep the amplitude of the digital signal constant, the quantity of cancellation or elimination of the FM audio signal recorded adjacent to the digital signal also becomes constant, thus making it possible to prevent spectra of unnecessary signals from being produced in a frequency band before and after the carrier frequency of the FM audio signal.

As just described above, in accordance with this invention, since a limiter is provided after the OQDPSK modulator, even in the case of recording the video signal, the digital signal and the FM audio signal at the upper layer portion (surface layer portion), the intermediate layer portion, and the lower layer portion while forming the same track, there is no possibility that the AM component by the digital signal is produced in the FM audio signal, with the result that the S/N ratio of the reproduced output of the FM audio signal can be improved. Furthermore, since this permits the recording level of the FM audio signal to be suppressed, the effect or influence on the video signal of the FM audio signal can be reduced, resulting in a high quality pictorial image.

Moreover, since the FM audio signal and the digital audio signal can be concurrently recorded and reproduced, there is no inconvenience of being required to prepare two kinds of recorded tape softwares or provide two VTRs to conduct dubbing from the FM audio signal to the digital audio signal, or from the digital audio signal to the FM audio signal. Furthermore, since the FM audio signal and the digital audio signal can be independently used, it is possible to record, e.g., sound or speech of a television as a FM audio signal, and to simultaneously record the sound or speech of a compact disk (CD), a digital audio taperecorder (DAT), or a FM broadcast as a digital audio signal.

In addition, in movie software for VTR, e.g., high quality recording/reproducing of sound or speech of a foreign language and sound or speech of the Japanese language can be advantageously conducted with the former being as a digital signal and the latter being as a FM audio signal both in accordance with the stereophonic sound system.

DESCRIPTION OF THE PREFERRED EMBODIMENT

Figure 2:
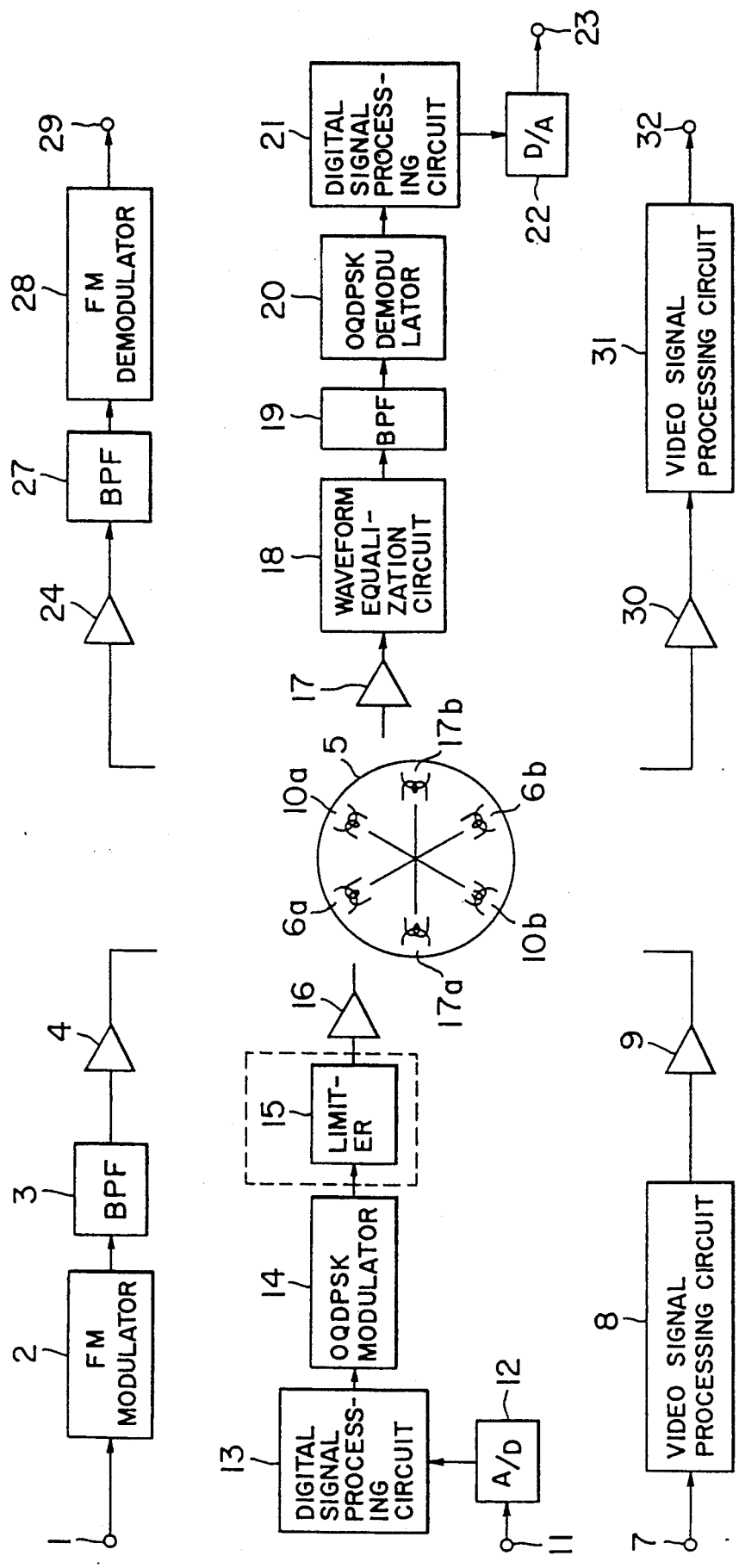
FIG. 2 is a block diagram showing the circuit configuration of a magnetic recording and reproducing apparatus according to this invention.

FIG. 2 is a block diagram showing an embodiment of this invention. The apparatus shown in this figure is provided with input terminals 1, 7 and 11 and output terminals 23, 29 and 32. To the input terminals 1, 7 and 11, a first audio signal and a video signal to be frequency-modulated and recorded, and a second audio signal to be recorded as a digital signal are delivered, respectively. From output terminals 29, 23 and 32, the first and second audio signals and the video signal which have been demodulated are output, respectively. Namely, this apparatus has a configuration capable of recording/reproducing two kinds of audio signals in addition to the video signal.

The first audio signal incoming to the input terminal 1 is subjected to frequency modulation by a frequency modulator (FM modulator) 2. The frequency-modulated signal is delivered to a band-pass filter (BPF) 3, at which only a predetermined frequency band is passed therethrough. The signal thus obtained is amplified by a recording amplifier 4, and is then recorded at the lower (deep) layer portion of a magnetic tape (not shown) by means of rotary heads 6a and 6b for FM audio signal provided at an angular interval of 180 degrees on the circumference of a rotary drum 5. These rotary heads are also used for playback or reproducing. The same can be said of the following description.

A second audio signal incoming to the input terminal 11 is converted to a digital signal by an A/D converter 12, and then undergoes a predetermined pulse code modulation (PCM) signal processing by a known digital signal processing circuit 13. Then, the signal thus obtained undergoes the well known OQDPSK modulation at an offset quadrature differential PSK (OQDPSK) modulator 14, and is then passed through a limiter 15 and an amplifier 16. The signal thus obtained is recorded, along with the FM audio signal, at the intermediate layer portion on the same track of the magnetic tape by means of rotary heads 17a and 17b provided on the circumference of the rotary drum 5.

Furthermore, a video signal incoming to the input terminal 7 undergoes the well known signal processing by a video signal processing circuit 8, and is then amplified by a recording amplifier 9. The signal thus amplified is recorded at the upper (surface) layer and 10b provided at an angular interval of 180 degrees at positions different from those of the rotary heads 6a and 6b on the circumference of the rotary drum 5.

Figure 3:
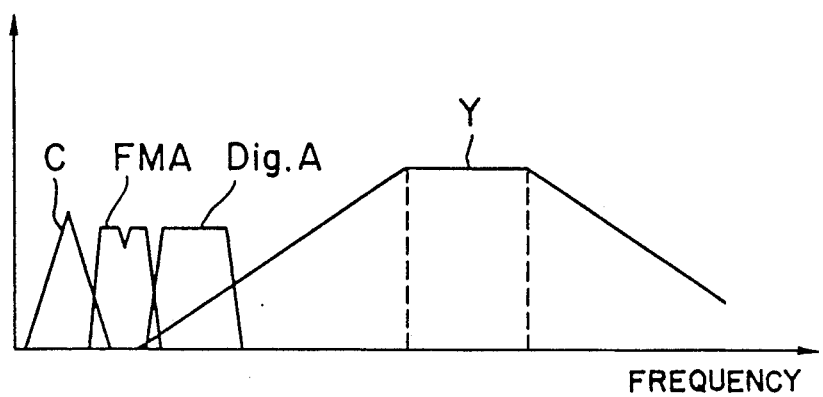
FIG. 3 is a graphical representation of spectra of the video signal, the digital audio signal and the FM audio signal recorded on a magnetic tape.

The frequency spectra of respective signals recorded as stated above are schematically shown in FIG. 3. In this figure, Y and C represent a luminance signal and a chrominance signal of the video signal, respectively, FMA represents a FM audio signal, and Dig.A represents a digital audio signal.

By recording signals different from each other at the upper layer portion, the intermediate layer portion, and the lower layer portion of a single magnetic tape, the magnetic tape as the recording medium can be efficiently used and operability is also improved. However, the interference between respective signals may be of question. To overcome this, there is an arrangement in the apparatus shown in FIG. 2 such that the azimuth angles of the magnetic heads 6a and 6b for recording-/reproducing the FM audio signal are ±30 degrees, respectively, that the azimuth angles of the magnetic heads 10a and 10b for recording/reproducing the video signal are ±6 degrees, respectively, and that the azimuth angles of the magnetic heads 17a and 17b for recording/reproducing the digital audio signal are ±20 degrees, respectively, to therefore suppress interference between signals different from each other.

At the time of playback or reproducing, respective rotary heads used as the recording heads will be used for reproducing. The reproduced FM audio signal reproduced from the lower layer portion of the magnetic tape by means of rotary heads 6a and 6b is passed through amplifier 24 and BPF 27, and is then demodulated at a frequency demodulator (FM demodulator) 28. The signal thus demodulated is taken out from the output terminal 29. Moreover, the reproduced video signal reproduced from the upper layer portion of the magnetic tape by means of the rotary heads 10a and 10b undergoes well known signal processing at a video signal processing circuit 31 through an amplifier 30, and is then taken out from the output terminal 32.

On the other hand, the digital audio signal reproduced from the intermediate layer portion of the magnetic tape by means of the rotary heads 17a and 17b is amplified at an amplifier 17, and undergoes waveform equalization processing at a waveform equalization circuit 18 so that the lowered level of the high frequency component is restored. Thereafter, this signal is demodulated at an OQDPSK demodulator 20 through a BPF 19, and is decoded by a known digital signal processing circuit 21 and then converted to an analog signal by a D/A converter 22. This circuit 21 decodes the signals encoded by the circuit 13 and the analog signal thus obtained is taken out from the output terminal 23.

The effect of improvement by the provision of the limiter 15 will be now described. The OQDPSK modulator 14 has an output waveform, in a model form, as shown in FIG. 4B. This waveform includes AM components such that the amplitude changes. For this reason, unless the limiter 15 is provided, the following problem would arise. Namely, if the output of the OQDPSK modulator 14 is recorded at the intermediate layer portion of the magnetic tape as it is without passing it through the limiter 15, the FM audio signal recorded adjacently to the lower layer portion of the magnetic tape changes in a manner that the quantity of erasure due to overwriting is increased at the portions where the amplitude of the AM component of the PCM audio signal is large. Thus, the reproducing level of the FM audio signal would have an AM component corresponding to the output waveform of the OQDPSK modulator 14 as schematically shown in FIG. 4C.

Figure 5A:
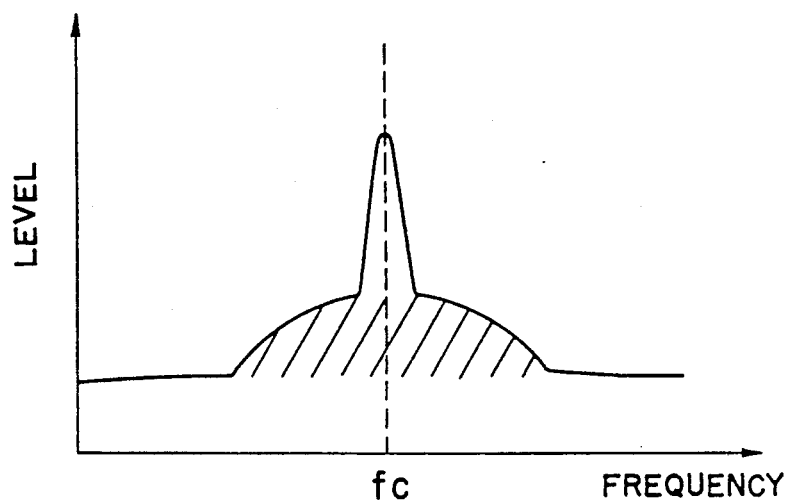
FIGS. 5A and 5B are graphical representations of the spectra of a reproduced signal of the FM audio signal.

As a result, the spectrum in the case of reproducing the FM audio signal thus recorded, would produce an AM sideband (hatched portion in FIG. 5A) over a broad frequency range on the both sides of, the carrier frequency $f_c$ as shown in FIG. 5A. The C/N ratio of the FM audio signal would therefore be lowered and the speech quality is degraded.

If an attempt is made to increase the recording level of the FM audio signal with a view to relatively decreasing the change in the quantity of erasure to maintain the sound quality of the FM audio signal, this effect would in turn appear on the video signal recorded at the upper layer portion of the magnetic tape, resulting in a lowered picture quality.

In addition, the AM sideband spreading over a frequency band above and below the carrier frequency $f_c$ of the FM audio signal expands to the chrominance signal region of the video signal where the azimuthal effect is decreased, resulting in the occurrence of a degraded color signal.

Figure 1:
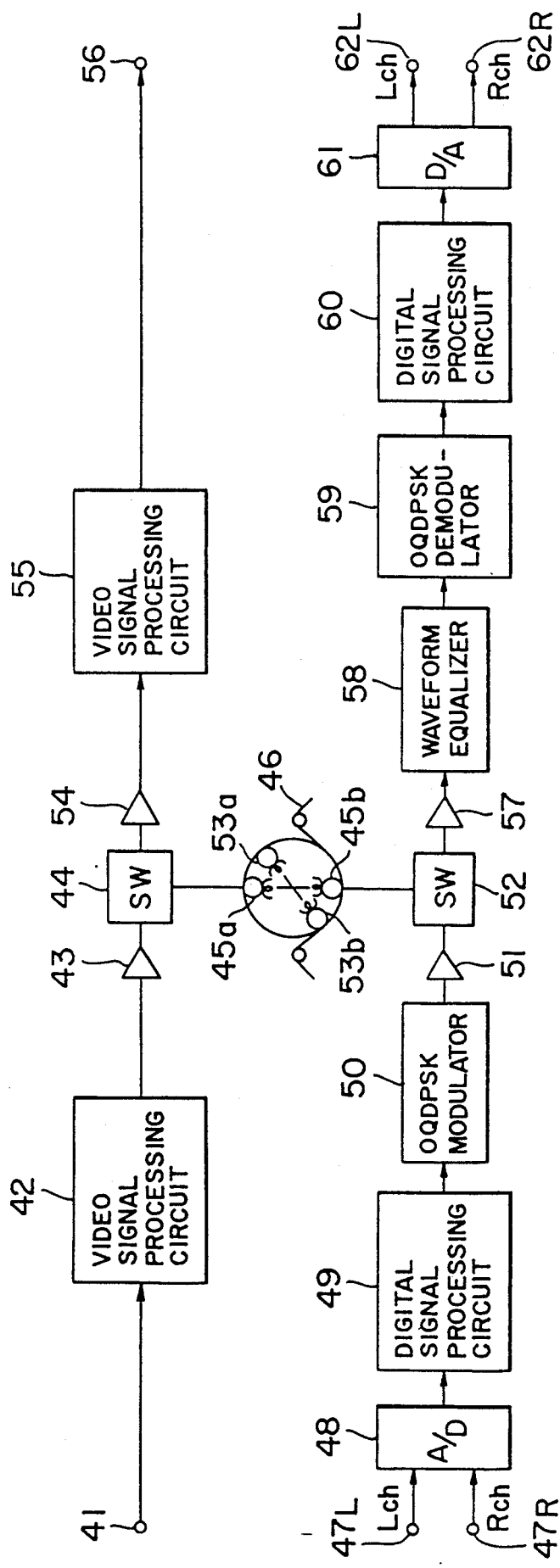
FIG. 1 is a block diagram showing the circuit configuration of a conventional magnetic recording and reproducing apparatus.
Figure 4A:
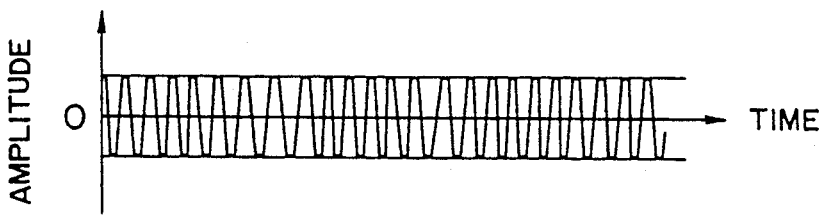
FIGS. 4A, 4B and 4C are schematic diagrams showing the output waveform of the limiter, the output waveform of the OQDPSK modulator, and the reproduced signal waveform of the FM audio signal, respectively.
Figure 4B:
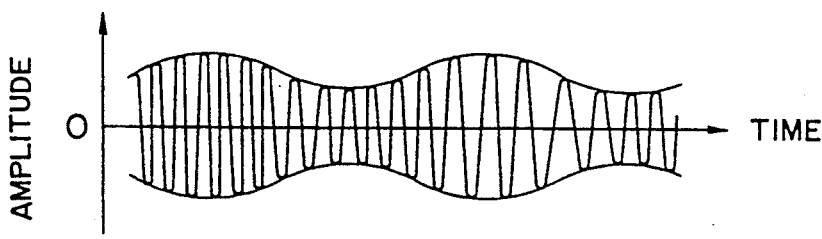
Figure 4C:
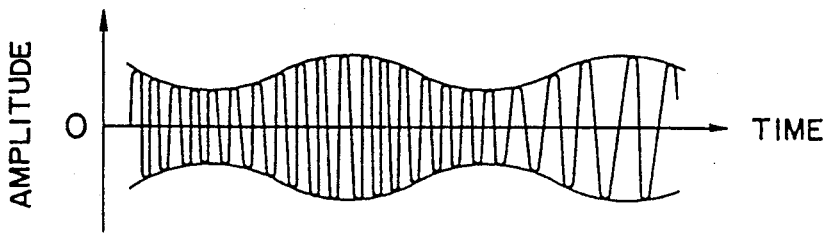

For the above reasons, by providing the limiter 15 at the position of FIG. 1, the amplitude of the output waveform of the OQDPSK modulator 14 can be kept constant as shown in FIG. 4A.

Figure 5B:
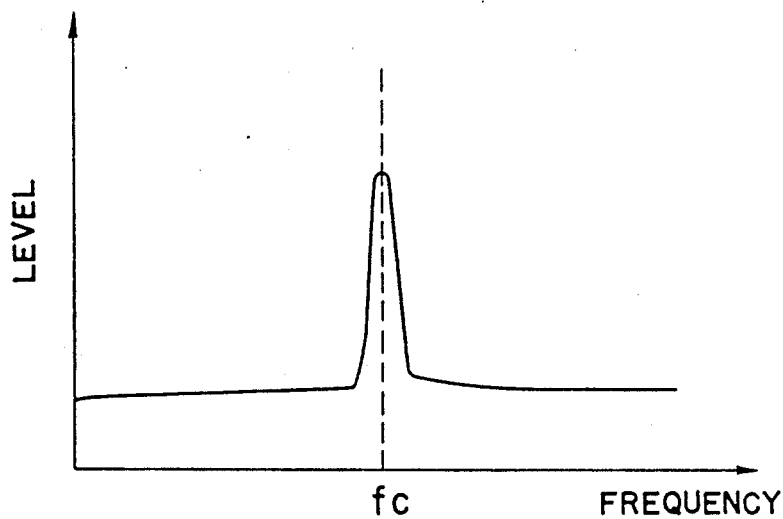

By allowing the amplitude of the digital audio signal to be kept constant in this way, even in the case of recording the digital audio signal and the FM audio signal at adjacent magnetic layers, the quantity of elimination of the FM audio signal becomes constant, resulting in no possibility that an AM component is produced in the FM audio signal. The FM audio signal thus recorded has a spectrum of the reproduced waveform thereof, as schematically shown in FIG. 5B. As compared to the spectrum of the reproduced waveform shown in FIG. 5A, hardly any unnecessary signal occurs in the frequency band in the vicinity of the carrier frequency. For this reason, the C/N of the FM audio signal is improved and the degradation of sound quality is prevented.

As just described, when the C/N ratio of the FM audio signal is improved, there is no need to increase the recording level of the FM audio signal as in the prior art, and degradation of a video signal due to an increase in the recording level can be prevented.

Figure 6:
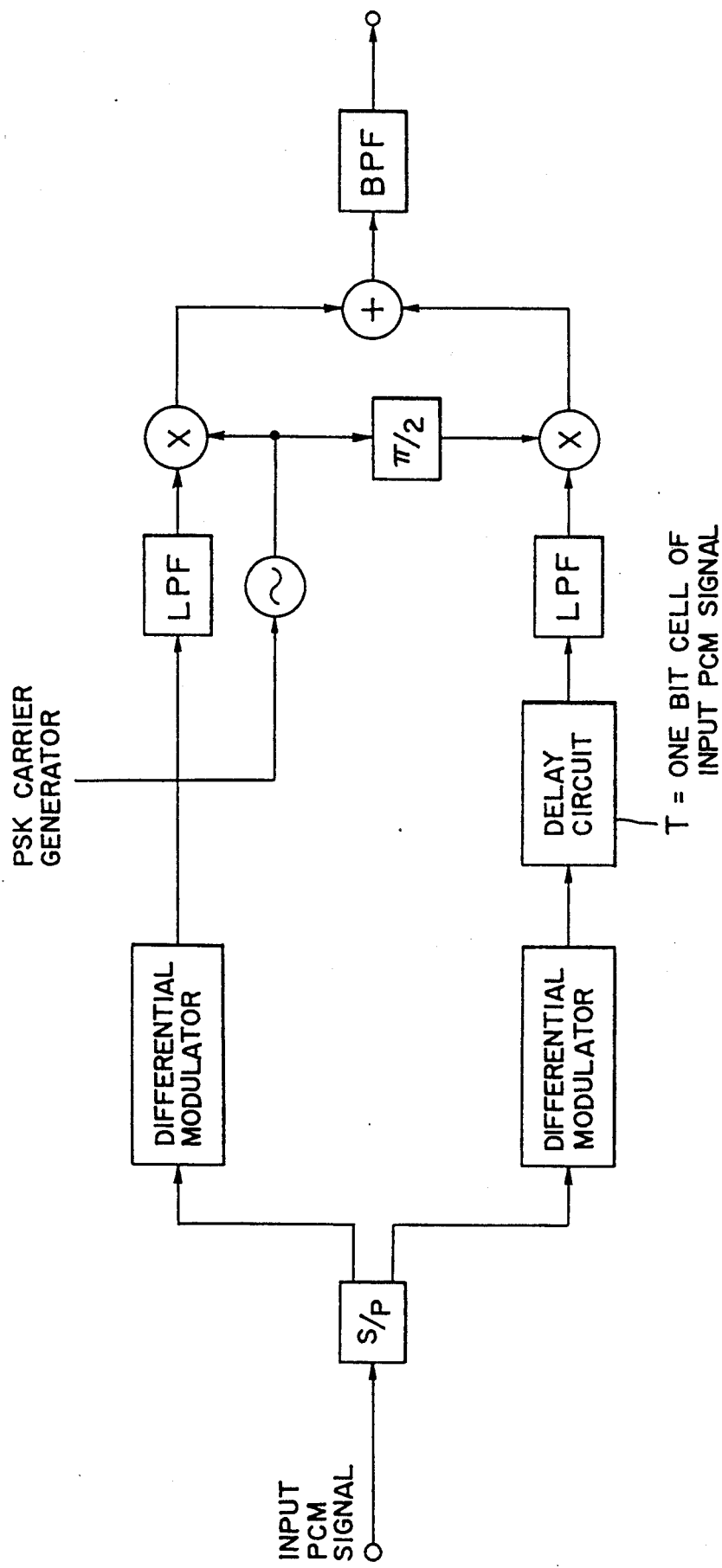
FIG. 6 is a block diagram showing an example of a conventional the OQDPSK modulator.

It is to be noted that means for keeping the amplitude of the digital audio signal to be kept constant is not limited to the limiter 15. For example, there may be employed a scheme such that, within the OQDPSK modulator, high-frequency components of the input or output digital signals to or from the low-pass filters (LPFs in FIG. 6) are emphasized, to therefore enhance the output at the time when the phase of a modulated output changes. It is needless to say that the same advantages as those stated above can be obtained also in such a case.

The modulation system of the signal recorded at the intermediate layer portion of the magnetic layer is not limited to the OQDPSK modulation. Other offset or non-offset poly-phase differential phase shift keying modulation system may be used instead of the OQDPSK modulation.

In addition, while the audio signal is used as the digital signal in this embodiment, this invention is not limited to such use. Other signals may of course be subjected to recording/reproducing as digital signals.

What is claimed is:

1. A magnetic recording apparatus comprising:
   first modulator means for generating a frequency-modulated audio signal;
   a first rotary head for recording said audio signal from said first modulation means at a lower layer portion of a magnetic layer of a magnetic tape;
   second modulator means for generating a digital signal having undergone poly-phase differential phase shift keying modulation;
   amplitude change elimination means for eliminating changes in the amplitude of said digital signal from said second modulator means;
   a second rotary head having an azimuth angle different from that of said first rotary head for recording said digital signal from said amplitude change elimination means at an intermediate layer portion of the magnetic layer of said magnetic tape;
   video signal recording processing means for processing a video signal; and
   a third rotary head having an azimuth angle different from those of said first rotary head and said second rotary head, for recording said video signal from said image signal recording processing means at an upper layer portion of the magnetic layer of said magnetic tape, thus to record said frequency-modulated audio signal and said digital signal along with said video signal at the magnetic layer portions different from each other.

2. A magnetic recording apparatus as set forth in claim 1, in which the second modulator means generates the digital signal having undergone the offset differential quadrature phase shift keying modulation.

3. A magnetic recording/reproducing apparatus being constructed to add, to said magnetic recording apparatus as described above, comprising:
   first reproduction means for reproducing a recorded signal of a magnetic tape recorded by said magnetic recording apparatus as set forth in claim 1 to reproduce a frequency-modulated audio signal,
   first demodulator means for frequency-demodulating said reproduced frequency-modulated audio signal,
   second reproduction means for reproducing said digital signal recorded on said magnetic tape,
   second demodulator means for applying the poly-phase differential phase shift keying demodulation or the offset poly-phase differential PSK phase shift keying demodulation to said reproduced digital signal,
   third reproduction means for reproducing said video signal recorded on said magnetic tape, and
   video signal reproduction processing means for processing said reproduced video signal, thereby to record, on said magnetic tape, said frequency-modulated audio signal and said digital signal along with said video signal, and to reproduce them therefrom.

* * * * *